US009170316B2

(12) United States Patent
Brandao et al.

(10) Patent No.: US 9,170,316 B2
(45) Date of Patent: Oct. 27, 2015

(54) SYSTEMS AND METHODS FOR IMPROVING BEARING AVAILABILITY AND ACCURACY FOR A TRACKING FILTER

(71) Applicants: Ruy C. Brandao, Redmond, WA (US); Eduard Shestak, Morristown, NJ (US); Ian Dougherty, Morristown, NJ (US)

(72) Inventors: Ruy C. Brandao, Redmond, WA (US); Eduard Shestak, Morristown, NJ (US); Ian Dougherty, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 358 days.

(21) Appl. No.: 13/661,064

(22) Filed: Oct. 26, 2012

(65) Prior Publication Data

US 2014/0210669 A1  Jul. 31, 2014

(51) Int. Cl.
| | |
|---|---|
| *G01S 1/00* | (2006.01) |
| *G01S 1/04* | (2006.01) |
| *G01S 3/02* | (2006.01) |
| *G01S 3/46* | (2006.01) |
| *G01S 13/93* | (2006.01) |
| *G01S 3/10* | (2006.01) |

(52) U.S. Cl.
CPC . *G01S 1/04* (2013.01); *G01S 3/023* (2013.01); *G01S 3/46* (2013.01); *G01S 3/10* (2013.01); *G01S 13/9303* (2013.01)

(58) Field of Classification Search
CPC .............. G01S 1/00; G01S 1/08; G01S 5/02; G01S 3/46; G01S 13/9303; G01S 3/10
USPC .......................................... 342/385, 386, 424
See application file for complete search history.

(56) References Cited

U.S. PATENT DOCUMENTS

| 4,855,748 A | 8/1989 | Brandao et al. |
| 5,235,336 A | 8/1993 | Sturm et al. |

(Continued)

FOREIGN PATENT DOCUMENTS

EP    1901087 A1    3/2008

OTHER PUBLICATIONS

Search Report from counterpart EPC Application No. 13186964.6-811, dated Feb. 10, 2014, 3 pp.

(Continued)

*Primary Examiner* — Harry Liu
(74) *Attorney, Agent, or Firm* — Shumaker & Sieffert, P.A.

(57) ABSTRACT

Systems and methods for improving bearing availability and accuracy in a traffic collision-avoidance system (TCAS). In an exemplary method, if only a single phase-difference value is received for one of two two-element antennas, a processor determines an expected maximum antenna element phase-difference value for the elements of the two-element antenna that did not receive a phase-difference value for a target signal source; estimates a phase-difference value for the two-element antenna that did not include a phase-difference value, based on the expected maximum antenna element phase-difference value and a previously determined predicted bearing value; and calculates bearing based on the estimated phase-difference value and a phase-difference value received from the other two-element antenna. The determination is based on previously received signals associated with the target signal source and based on elevation information of the target signal source and a predefined maximum antenna element phase-difference value for the respective antenna element pair. An output device outputs information associated with the calculated bearing.

15 Claims, 2 Drawing Sheets

(56) References Cited

U.S. PATENT DOCUMENTS

| | | |
|---|---|---|
| 5,552,788 A | 9/1996 | Ryan et al. |
| 5,677,693 A | 10/1997 | Frankot et al. |
| 6,169,519 B1 | 1/2001 | Holecek et al. |
| 6,223,123 B1 | 4/2001 | Ryan et al. |
| 7,583,223 B2 | 9/2009 | Brandao et al. |
| 2005/0156777 A1* | 7/2005 | King et al. ............ 342/29 |
| 2008/0068250 A1 | 3/2008 | Brandao et al. |
| 2008/0120032 A1 | 5/2008 | Brandao et al. |
| 2008/0204310 A1 | 8/2008 | Blessing et al. |
| 2008/0284637 A1* | 11/2008 | Blessing et al. ............ 342/30 |
| 2010/0117886 A1 | 5/2010 | Brandao et al. |
| 2011/0267216 A1 | 11/2011 | Smith |

OTHER PUBLICATIONS

U.S. Appl. No. 13/661,029, by Zeng et al., filed on Oct. 25, 2012.
U.S. Appl. No. 13/661,065, by Shestak et al., filed on Oct. 26, 2012.

* cited by examiner

SYSTEMS AND METHODS FOR IMPROVING BEARING AVAILABILITY AND ACCURACY FOR A TRACKING FILTER

BACKGROUND OF THE INVENTION

A current aircraft antenna system includes two two-element antenna devices—one located on the top of the aircraft and one located on the bottom of the aircraft. These antennas transmit and receive signals (e.g., traffic collision-avoidance system (TCAS)) with other aircraft. According to the phase difference of the signals received at both two element antennas, the bearing of the source of the signal can be determined. However, determination of phase difference may not always be possible, due to signal quality. In this situation, bearing cannot be accurately determined.

SUMMARY OF THE INVENTION

The present invention provides systems and methods for improving bearing availability and accuracy in a traffic collision-avoidance system (TCAS). In an exemplary method, if only a single phase-difference value is received for one of two two-element antennas, a processor determines an expected maximum antenna element phase-difference value for the elements of the two-element antenna that did not receive a phase-difference value for a target signal source; estimates a phase-difference value for the two-element antenna that did not include a phase-difference value, based on the expected maximum antenna element phase-difference value and a previously determined predicted bearing value; and calculates bearing based on the estimated phase-difference value and a phase-difference value received from the other two-element antenna. The determination is based on previously received signals associated with the target signal source and based on elevation information of the target signal source and a predefined maximum antenna element phase-difference value for the respective antenna element pair. An output device outputs information associated with the calculated bearing.

BRIEF DESCRIPTION OF THE DRAWINGS

Preferred and alternative embodiments of the present invention are described in detail below with reference to the following drawings:

FIG. 1-2 illustrates an antenna set-up for the aircraft shown in FIG. 1-1;

FIG. 2 shows a flow diagram of an example process performed by the system shown in FIG. 1-1.

DETAILED DESCRIPTION OF THE INVENTION

Figure 1:
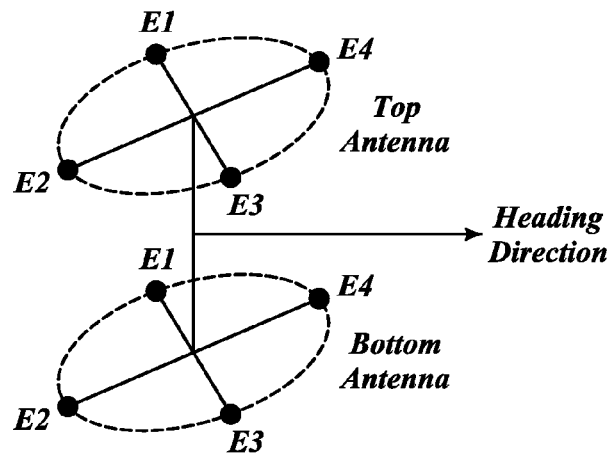
FIG. 1-1 is a schematic diagram of an aircraft having a system formed in accordance with an embodiment of the present invention.
Figure 1:
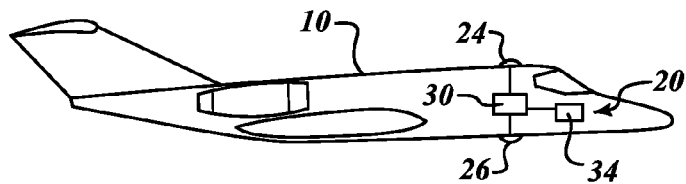

FIG. 1-1 illustrates an exemplary aircraft 10 having a traffic collision-avoidance system (TCAS) 20 formed in accordance with an embodiment of the present invention. The TCAS 20 includes a first two-element antenna 24 located on the top of the aircraft 10, a second two-element antenna 26 on the bottom of the aircraft 10, and a TCAS processor 30 that is in signal communication with the antennas 24, 26. The processor 30 performs bearing detection based on signals received from the antennas 24, 26. The bearing value detected is sent to another device 34 for output, such as a display device.

The aircraft 10 may be of various types (e.g., fixed-wing, unmanned, vertical takeoff and landing, etc.).

Figures 1, 2:
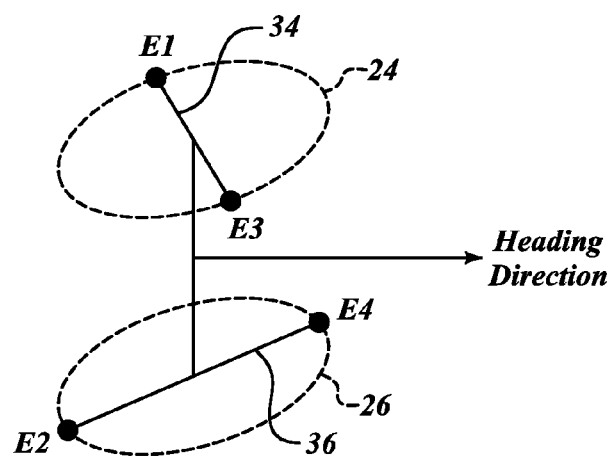
Figure 2:
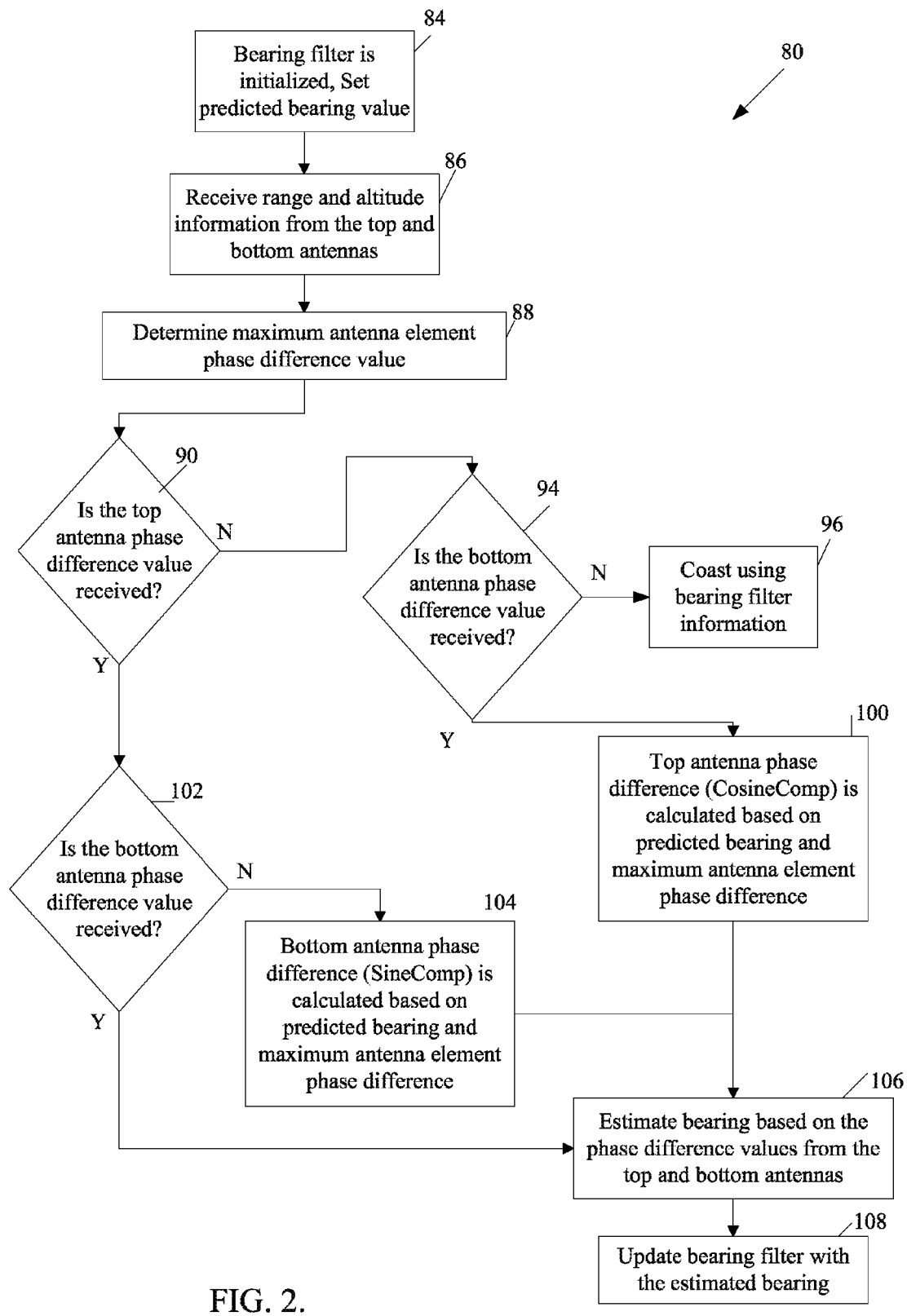

As shown in FIGS. 1-2, a first axis that links the two elements E1, E3 of the first antenna 24 may be orthogonal to a second axis that links the two elements E2, E4 of the second antenna 26. The vertical axis doesn't necessarily run through the aircraft's center of gravity.

FIG. 2 illustrates an exemplary process 80 performed by the processor 30. First at a block 84, a bearing filtered for a signal source (i.e., other aircraft) is initialized using complete sets of signals received at the elements of the antennas 24, 26. At this step, an initial bearing estimate is established and future bearing estimates can be predicted based on more than one bearing measurement. Next at a block 86, range and altitude information for the reply source are received at the processor 30 from the top and bottom antennas 24, 26. The same signal that generates bearing is also used to measure range and altitude. The range and altitude information is included in a TCAS interrogation response received at the antennas 24, 26. Then at a block 88, the processor 30 determines maximum antenna element phase difference for the top and bottom antennas. This step can be predetermined with the information stored for later use.

Then, a couple of determinations are made, at decision blocks 90, 94, 102, to determine if phase-difference values have not been received for one or both of the pairs of antenna elements (the antennas 24, 26). At a block 96, phase-difference values have not been received at either the top or bottom antennas 24, 26, so the processor 30 is placed in a coasting mode. In the coasting mode, the information in the existing bearing filter is used to update location information for targets.

When only the bottom antenna's phase-difference value is received, then, at block 100, the top antenna's phase-difference value is determined based on the predicted bearing value, the elevation of the target as determined using the position information and/or orientation information of the host aircraft, and the received range and altitude information of the target (source).

When only the top antenna's phase-difference value is received, then, at block 104, the bottom antenna's phase-difference value is determined based on the predicted bearing value, the elevation of the target as determined using the position information of the host aircraft, and the received range and altitude information of the target.

After the missing phase-difference information has been determined or if phase-difference information was not missing, then, at a block 106, bearing is estimated as normal but with the received or newly determined phase-difference values. Next, at a block 108, the bearing filter is updated with the estimated bearing.

The following shows an embodiment of an exemplary bearing tracking algorithm.

Step 1

The bearing filter is initialized, so bearing is predicted.

Step 2

A reply is received that provides range, altitude, and top and bottom antenna element phase difference. The phase difference for one or both antennas may or may not be available.

Depending on elevation angle of the reply source, maximum antenna element phase difference is calculated where the magnitude of the maximum and minimum phase excursion (i.e., maximum antenna element phase difference) given by antenna element spacing for zero elevation angle, elevation angle to the other traffic relative to the plane of the antenna.

Step 3

If one of the antenna element pairs is missed then it is calculated.

If the other of the antenna element pairs is missed then it is calculated.

Step 4

The bearing is estimated as a two-argument function representing an angle between positive axis and a line.

Step 5

The bearing filter is updated with the bearing.

In one embodiment, a filter that predicts the target signal source's bearing based on the physical dynamics of the target relative to the system's own aircraft is used in order to increase the probability of maintaining an accurate bearing estimation for the target signal source.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
    at a processor,
        if only a single phase-difference value is received for one of two two-element antennas,
            determining an expected maximum antenna element phase-difference value for the elements for the two-element antenna that did not receive a phase-difference value for a target signal source,
            wherein determining is based on previously received signals associated with the target signal source and based on elevation information of the target signal source and a predefined maximum antenna element phase-difference value for the respective antenna element pair,
            estimating a phase-difference value for the two-element antenna that did not include a phase difference value based on the expected maximum antenna element phase difference value and a previously determined predicted bearing value, and
            calculating bearing based on the estimated phase-difference value and a phase-difference value received from the other two-element antenna; and
    at an output device,
        outputting information associated with the calculated bearing.

2. The method of claim 1, further comprising, at the processor, updating a bearing filter based on the calculated bearing.

3. The method of claim 1, wherein the processor, the two-element antennas, and the output device are located on an aircraft.

4. The method of claim 3, wherein one of the two-element antennas is located on a top of the aircraft and the other of the two-element antennas is located on a bottom of the aircraft.

5. The method of claim 3, wherein the processor and the two-element antennas are included in a traffic collision-avoidance system (TCAS).

6. The method of claim 1, further comprising at the processor determining the predicted bearing value based on physical dynamic information of the target signal source.

7. A system comprising:
    first and second two-element antennas;
    a processor coupled to the antenna, the processor configured to
        determine an expected maximum antenna element phase-difference value for the elements for the two-element antenna that did not receive a phase-difference value for a target signal source, wherein the determination is based on previously received signals associated with the target signal source and based on elevation information of the target signal source and a predefined maximum antenna element phase-difference value for the respective antenna element pair,
        estimate a phase-difference value for the two-element antenna that did not include a phase difference value based on the expected maximum antenna element phase-difference value and a previously determined predicted bearing value, and
        calculate bearing based on the estimated phase-difference value and a phase-difference value received from the other two-element antenna,
        if only a single phase-difference value is received for one of two two-element antennas; and
    an output device coupled to the processor, the output device configured to output information associated with the calculated bearing.

8. The system of claim 7, wherein the processor is further configured to update a bearing filter based on the calculated bearing.

9. The system of claim 7, wherein the system is included in an aircraft, the first two-element antenna is located on a bottom of the aircraft and the second two-element antenna is located on a top of the aircraft.

10. The system of claim 7, wherein the processor and the two-element antennas are included in a traffic collision-avoidance system (TCAS).

11. The system of claim 7, wherein the processor is further configured to determine the predicted bearing value based on physical dynamic information of the target signal source.

12. A system comprising:
    a means for determining an expected maximum antenna element phase-difference value for the elements for the two-element antenna that did not receive a phase-difference value for a target signal source;
    a means for estimating a phase-difference value for the two-element antenna that did not include a phase-difference value based on the expected maximum antenna element phase-difference value and a previously determined predicted bearing value;
    a means for calculating bearing based on the estimated phase-difference value and a phase-difference value received from the other two-element antenna, if only a single phase-difference value is received for one of two two-element antennas; and
    a means for outputting information associated with the calculated bearing,
    wherein the means for determining determines based on previously received signals associated with the target signal source and based on elevation information of the target signal source and a predefined maximum antenna element phase-difference value for the respective antenna element pair.

13. The system of claim 12, further comprising a means for updating a bearing filter based on the calculated bearing.

14. The system of claim 12, wherein the system is located on an aircraft.

15. The system of claim 12, further comprising a means for determining the predicted bearing value based on physical dynamic information of the target signal source.

* * * * *